United States Patent [19]
Moreh et al.

[11] Patent Number: 6,158,007
[45] Date of Patent: Dec. 5, 2000

[54] SECURITY SYSTEM FOR EVENT BASED MIDDLEWARE

[75] Inventors: Jahanshah Moreh, 2210 Roscmare Rd., Los Angles, Calif. 90077; Terry M. Olkin, 966 Governors Bay Dr., Redwood Shores, Calif. 94065

[73] Assignees: Jahanshah Moreh, Los Angeles; Terry M. Olkin, Redwood Shores, both of Calif.

[21] Appl. No.: 08/932,322

[22] Filed: Sep. 17, 1997

[51] Int. Cl.[7] ..................................................... H04L 9/00
[52] U.S. Cl. ............................................................. 713/201
[58] Field of Search ........................ 380/25; 395/187.01; 713/150, 201, 166, 164, 200; 711/163

[56] References Cited

U.S. PATENT DOCUMENTS

| | | | |
|---|---|---|---|
| 5,265,221 | 11/1993 | Miller | 711/163 |
| 5,511,122 | 4/1996 | Atkinson | 380/25 |
| 5,937,159 | 8/1999 | Meyers et al. | 713/201 |
| 5,940,591 | 8/1999 | Boyle et al. | 713/201 |

*Primary Examiner*—Tod R. Swann
*Assistant Examiner*—Matthew Smithers
*Attorney, Agent, or Firm*—Hickman Coleman & Hughes, LLP

[57] ABSTRACT

A security system (10) for users (50) to employ applications (12) as either publishing applications (24) or subscribing applications (26), for communicating messages (16) on computer networks. Each application (12) includes a client (28) which obtains from the user (50) a user ID (52) and a password (54), for authentication to a broker (30). The messages (16) are each assigned a subject (18) having a security policy (20), which includes an access control list (70) and a quality of protection (72). The access control list (70) may specify who may publish, who may subscribe, and who may ask for guaranteed delivery of messages (16) on the associated subject (18). Similarly, the quality of protection (72) may specify whether such messages (16) are privacy, integrity, or nonrepudiation protected, and whether they are to be audited. The broker (30) then employs the security policy (20) to control publishing and subscribing of the messages (16) and to provide the requested security protections.

26 Claims, 6 Drawing Sheets

| Subject | Authorized Publishers | Authorized Subscribers | Privacy | Integrity | Comments |
|---|---|---|---|---|---|
| A | Joe | PUBLIC | Yes | Yes | Explicit policy |
| A.P | Joe | PUBLIC | No | Yes | Explicit policy |
| A.K | Joe | PUBLIC | Yes | Yes | Policy through A |
| A.K.M | Joe | PUBLIC | Yes | Yes | Policy through A.K |
| A.K.M.N | Mary, Joe | Mary, Nat | Yes | Yes | Explicit policy |
| A.B | Allen | HR | Yes | Yes | Explicit policy |

SECURITY SYSTEM FOR EVENT BASED MIDDLEWARE

TECHNICAL FIELD

The present invention relates generally to providing comprehensive security for networks such as the Internet, and more particularly to security for event based business transactions carried out by communicating messages electronically with a minimum of publishing and subscribing application program involvement.

BACKGROUND ART

[The inventors use the term Internet to mean the Internet operating environment. This refers to any configuration that leverages the collection of the Internet protocol suite, an Internet browser, and the Java platform. As such, the term Internet encompasses the worldwide Internet, corporate Intranets, and cooperating Extranets. The inventors draw specific distinctions between Internet, Intranet, and Extranet only when required for clarity in the context of the discussion.]

The growth of the Internet and its associated operating environment has taken even its most ardent users by surprise. No matter what metric is used—the number of users, the number of participating organizations, the geographical reach, the amount of content, or the number of times one uses the Internet in the course of a day—this growth can only be characterized as explosive.

Simultaneously, the vendor community is rushing to provide point solutions that allow users to harness the communication power of the Internet. Often, these solutions seek to retrofit an existing environment to the Internet, or merely to provide a visually appealing user interface. These approaches lead to piecemeal solutions which do not address the most basic requirements for building robust, efficient, and secure applications for the Internet.

There are four salient requirements for building business-class applications for the Internet and its associated operating environment. The first requirement is support of non-provisioned client applications. Users need an environment where there are no preexisting software requirements for the client system. This means that the only software that the client system needs to have is a browser. This requirement has grown out of the cost and complexity associated with purchasing and installing software on large numbers of client systems. Implicit in this today is support for the Java Virtual Machine (JVM), within which one can run Java applets, which has given rise to the concept of the Network Computer (NC).

The second requirement is to provide for the natural flow of business events. On the Internet, entities can communicate business events (e.g. ordering an item, hiring a new employee, etc.). These event-based application transactions then need to trigger business processes automatically, efficiently, and securely. However, the entities involved in such events should not know about each other, i.e., decoupled communication is needed. Furthermore, the communicating entities should not have to wait for each other, so asynchronous communication is also needed.

The third requirement is guaranteeing robustness of information delivery. While the Internet is an excellent communication medium—having a planet-wide geographical reach, being very economical, and running a standard protocol, etc.—it does not provide for features that is needed to build business-class applications. Therefore there also is a need to raise the intelligence of information (or messages) on the Internet by providing for security, reliability, and transactional semantics, and all of this has to be done in an efficient and scaleable manner.

The fourth requirement is to allow enforcement of security policy in its entirety. A solution that does not address all security requirements, or at least the most important elements of one, will fail. Organizations also need to be able to implement security policies which are flexible, yet which are easily and effectively enforced.

In sum, the Internet is excellent as a communication medium. However, it lacks inherent support for important aspects of business-critical applications. The present invention complements the Internet by providing comprehensive security, thereby addressing one of the most important above requirements.

Elements Of A Security Policy:

[The reader is assumed to have basic familiarity with the publish/subscribe model of message trafficking.]

There are seven important requirements often listed in security policies, each of which may be posed as a question. These are:

Authentication—Who are you?
Authorization—What can you do?
Privacy—Who can see the data?
Integrity—What if data is changed while in transit?
Nonrepudiation—Can the originator of a transaction be proven?
Audit—What important event happened when?
Management—Can the security policy be dynamically managed and enforced?

Also sometimes considered, but of lessor importance, are:

Secure Single Signon (SSSO)—Can users maintain a single password for access to all resources?
Delegation—Can an entity act on behalf of another?

These later items are important issues, and some discussion herein will address particular aspects of them, but the seven requirements listed first above continue to be the most important. [Note that firewalls are not listed. Firewalls are merely a technology that is meant to address some of the listed issues, i.e., firewalls are merely partial solutions to underlying user concerns.]

Existing Solutions:

Much has been said and written about Internet security, and specifically its inherent lack. Within the last three years several new security protocols as well as extensions to existing protocols have been proposed and adopted. Among the most popular of these are the Secure Socket Layer (SSL) protocol, extension to IP for security (IPSEC), and Simple Key management for IP (SKIP). Most such protocols deal with privacy and integrity protection. And some deal with authentication in specific ways. For example, the SSL authentication protocol requires that the parties have a digital certificates. However, none of these deal with access control and nonrepudiation. Therefore, in summary, there is no single protocol that deals with all aspects of security in one comprehensive package. A limited discussion of methods employed by existing protocols follows.

The application may be responsible for enforcement of security: With many existing security solutions the application developer is responsible for enforcing the security policy. This type of security solution merely presents the application developer with a set of Application Programming Interfaces (API's). Implementations of SSL, Kerberos, the Distributed Computing Environment (DCE), any system based on the Generic Security Services API (GSS API), and CryptoAPI (from Microsoft) are examples of security solutions with extensive API's. This method leads to the application developer needing to learn the API, and then being responsible for at least some aspects of security, which in turn makes for complex applications that are difficult to change in the face of dynamic security requirements.

Preexisting software may be required: With both SSL and CryptoAPI the client must be provisioned with a "security service provider" (usually RSA's toolkit) for basic cryptographic functions such as encryption and message digesting.

Address authentication, privacy, and integrity: Most security solutions, including SSL, VPN (Virtual Private Network), IPSEC, and SKIP simply address authentication, privacy protection, and integrity protection. There are no provisions for other important security requirements such as authorization and access control, nonrepudiation, audit, and central administration and management.

Secure Socket Layer (SSL): SSL has provisions for authentication, privacy, and integrity. However, as noted previously, application developers must program to an API. The SSL authentication protocol is based upon digital certificates and associated private keys. Therefore, even though SSL is based upon a public key infrastructure, the private key of a principal is only used for establishment of secret session keys, which are in turn used for privacy and integrity protections. There are no provisions for nonrepudiation.

Simple Key Management for IP (SKIP): SKIP provides for authentication, privacy, and integrity with no programming requirements. However, security is provided at the network/transport levels (e.g., TCP/IP) and not at the application layer. Another way to say this is that SKIP, SSL, and IPSEC provide transport (or channel) security as opposed to message (or application) security. As such, with SKIP and similar protocols (including SSL) either all messages are protected or no message is protected.

Extensions to IP for Security (IPSEC): This is the same as SKIP.

Virtual Private Networks (VPN): This solution is generally offered by firewall vendors. It is in the same category as SKIP and IPSEC. In fact, some vendors use IPSEC and SKIP to implement their VPN.

Java as a language has a number of protection features which are enforced by the runtime environment. These features are designed to prevent a downloaded applet from maliciously or accidentally corrupting the user's computer, or otherwise transfer information from the user's computer to the server that sent the applet. With the Java Developer's Kit (JDK) 1.1 some security features have been built into the language. Some examples include provisions for digital signatures, message digesting, and very simple key management. However, it should particularly be noted that Java is a language which offers "safety features," but which has had no "security" features until the release of JDK version 1.1, and these features are not comprehensive. The present invention may be implemented using the Java language, and thereby some aspects of security may be provided for using features of this language, but it should be appreciated that Java is merely a language (i.e., a tool), and it is not a solution by itself. Further, it places the burden of providing a comprehensive security solution on the application developer.

Approaches To Building Secure Applications:

There are two main approaches to building secure applications. The first of these is an application based approach, where each application is responsible for enforcing some or all aspects of the security policy. Existing software products that take this approach provide an API for the application developer. Most vendors in this category allow an application to be build for authentication, privacy, and integrity. Enforcement of access control (i.e. authorization) is usually the most difficult. One can cite examples of writing so-called Access Control Managers for DCE, and the complexities associated with that. In any case, this approach usually leaves the possibility of incorrect implementation. Moreover, if the security policy changes, the application must then also be changed to reflect the new policy (for example, when a new access control permission is added to the system the application must check to see if the user is authorized to perform an operation according to the newly added permission).

The second approach to building secure applications is an automatic approach, where the application developer is completely relieved from enforcing any aspect of the security policy. The present invention is an example of this approach, wherein a client at runtime and a message broker collaborate to enforce the security policy, employing the premise that minimizing or eliminating application involvement in enforcing a security policy greatly enhances compliance with the security policy.

In a "perfect" implementation of the automatic approach there would be no API's. Unfortunately such is not realistic, since there i, a minimum quanta of information which must necessarily be gathered for security purposes. The problem then becomes what is that minimum, and how can it be obtained efficiently and in the least user burdensome manner? It is the inventors' contention that a user ID and a password are the minimum quanta. Accordingly, in implementations working with the invention presented herein, the application is responsible for soliciting minimal authentication information (e.g., user ID and password), and delivering it to the invention. The inventors' position is that soliciting a user ID and password are really a natural part of an application interaction with the user. This may be done through the use of a Java class, and the inventors do not consider such a class and its associated API to be an onerous security API.

It should be noted, however, that in systems where a password is not the ultimate means of authentication, a password is still used to obtain "credentials" for authentication. One can cite the example of a smartcard where a password or a PIN is used to gain access to a smartcard where the private key of an individual is stored.

It is the inventor's connection that all authentication models can be abstracted to soliciting a password from the user, irrespective of whether the password is ultimately used as a means to authenticate the user.

DISCLOSURE OF INVENTION

Accordingly, it is an object of the present invention to provide comprehensive security protection scheme for messages as they are published on and subscribed to on networks.

Another object of the invention is to provide a security protection scheme which minimally burdens users communicating on networks.

Another object of the invention is to provide a security protection scheme which minimally burdens developers of applications programs used communicating on networks.

And, another object of the invention is to provide a security protection scheme which is immediately and automatically enforced within all running applications.

Briefly, one preferred embodiment of the present invention is an a system for providing security for messages between users on a computer network by associating security policies to defined subjects which users wish to be able to publish on and subscribe to, assigning the subjects to messages, and then using a broker to identify and authorize the users and to enforce the security policies of the various subjects as the messages are communicated between (i.e., published by and subscribed to) the users of the network.

An advantage of the present invention is that it provides comprehensive communications security. The invention may employ access control over whom may publish and whom may subscribe to (i.e., receive) messages communicated on networks. Concurrently, the invention may maintain the privacy and integrity of messages, may provide for message nonrepudiation, and may audit messages.

Another advantage of the invention is that it minimally burdens those developing application programs using network communications, those using such programs, and those managing security for organizations of such users. In an environment employing the invention, only authorized system administrations personnel need have any concerns beyond identifying themselves, and providing a password to obtain authorization to carry out their intended communications tasks.

And, another advantage of the invention is that it provides very flexible enforcement of network security. Because of the inherent design of the invention, any changes to security may be made very quickly, and only then by suitably authorized personnel. Such changes may take effect immediately, and they require no involvement by either the users or the applications programs which they use.

BRIEF DESCRIPTION OF THE DRAWINGS

The purposes and advantages of the present invention will be apparent from the following detailed description in conjunction with the appended drawings in which:

FIG. 5a depicts how the security system may use tree structures and inheritance for security policies, while FIG. 5b is a tabular representation of the example in FIG. 5a;

BEST MODE FOR CARRYING OUT THE INVENTION

A preferred embodiment of the present invention is a system for providing comprehensive security functionality with a minimum of application involvement. As illustrated in the various drawings herein, and particularly in the view of FIG. 1, a form of this preferred embodiment of the inventive device is depicted by the general reference character 10.

Figure 1:
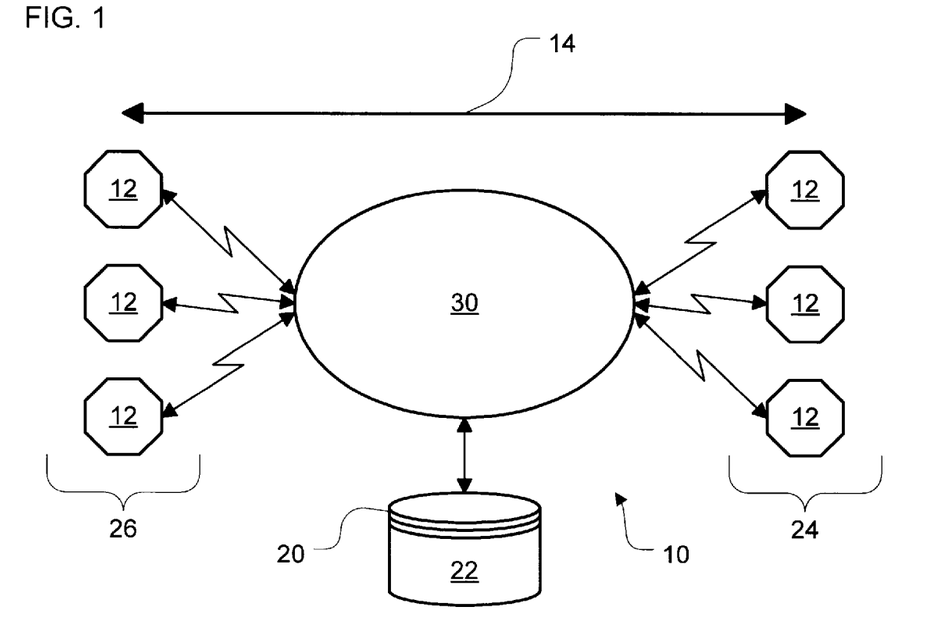
FIG. 1 depicts a communications environment using the inventive security system.
Figure 3:
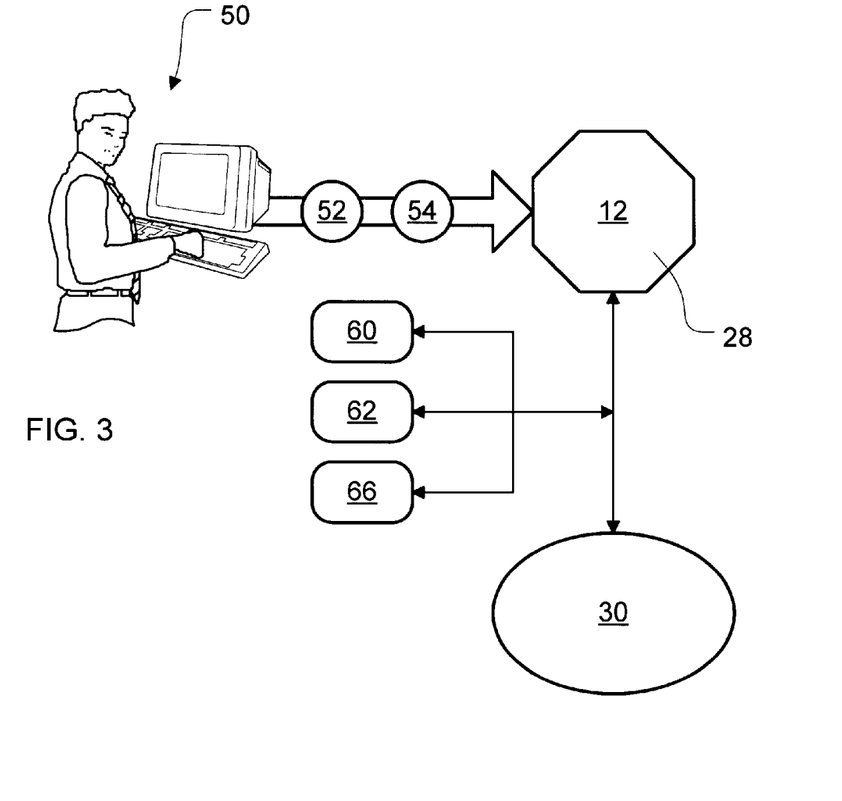
FIG. 3 depicts abstraction models usable by the security system for authentication and identification.

As depicted in FIG. 1, the security system 10 provides a comprehensive security environment as applications 12 produce and consume information 14 (depicted stylistically as an arrowed line). The information 14 is in the form of messages 16 upon subjects 18 (FIG. 6), which each have a pre-defined security policy 20 stored in a security repository 22. The applications 12 may be either publishing applications 24 or subscribing applications 26, and each have an integrated client 28 (FIG. 3). The publishing applications 24 produce messages 16 classified by subject 18; the subscribing applications 26 register their interest in receiving these messages 16 by subscribing to the subjects 18; and a broker 30 working with the clients 28 of the applications 12 routes and handles the messages 16 according to the associated security policies 20 of the particular subjects 18. It is one of the inventors' key observations that the flow of information either inherently already depends upon classification by subject 18.

To effectively enforce security the policies of an organization must be woven into the fabrics of every application 12. There are two ways to do this: each application 12 must understand, track, and enforce security as related to its domain of operation, or the very fabric of the application 12—the infrastructure that it builds upon—must understand, track, and enforce security. The design of the security system 10 is based upon the premise that the second option is more viable. The security system 10 follows the philosophy that an organization's policy governing security can be implemented much more effectively if the application 12 is not involved in security enforcement.

Figure 2:
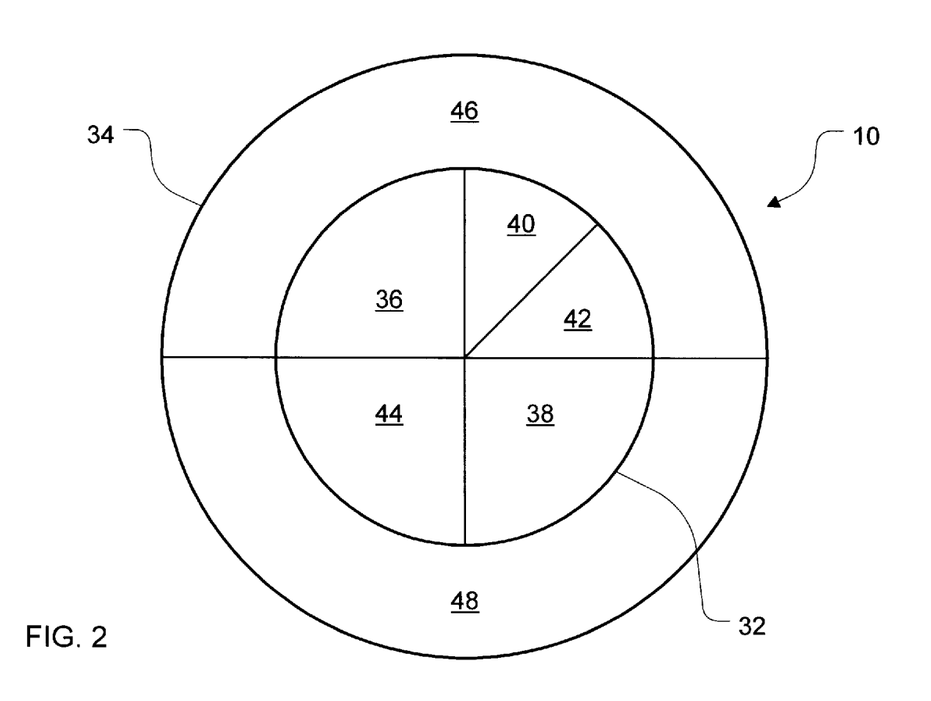
FIG. 2 depicts the major classes and services of the security system.

Classes and Services of the Invention:

FIG. 2 depicts the services which the security system 10 uses. These may be categorized into a core class 32, which provides intrinsic security functionality as part of the central engine of the security system 10, and into an extensible class 34, which provides additional functionality built upon the secure publish/subscribe infrastructure of the core class 32.

The core class 32 of the security system 10 includes an authentication service 36, an authorization service 38, a privacy service 40, an integrity service 42, and a nonrepudiation service 44. The authentication service 36 answers the question "who are you?" by providing identification and authentication of users, both as publishers and as subscribers. The authorization service 38 answers the question "what can you do?" by providing authorization and access control, again for both publishers and subscribers. The privacy service 40 provides assurance that no one other than the intended recipient-subscriber can view the substance of information sent by a sender-publisher. The integrity service 42 provides assurance that if data is changed while in transit, then the recipient-subscriber will know about this and may reject the message 16 (FIG. 4) as being corrupt. And the nonrepudiation service 44 provides assurances that sender-publishers cannot deny being the originators of messages 16.

Figure 6:
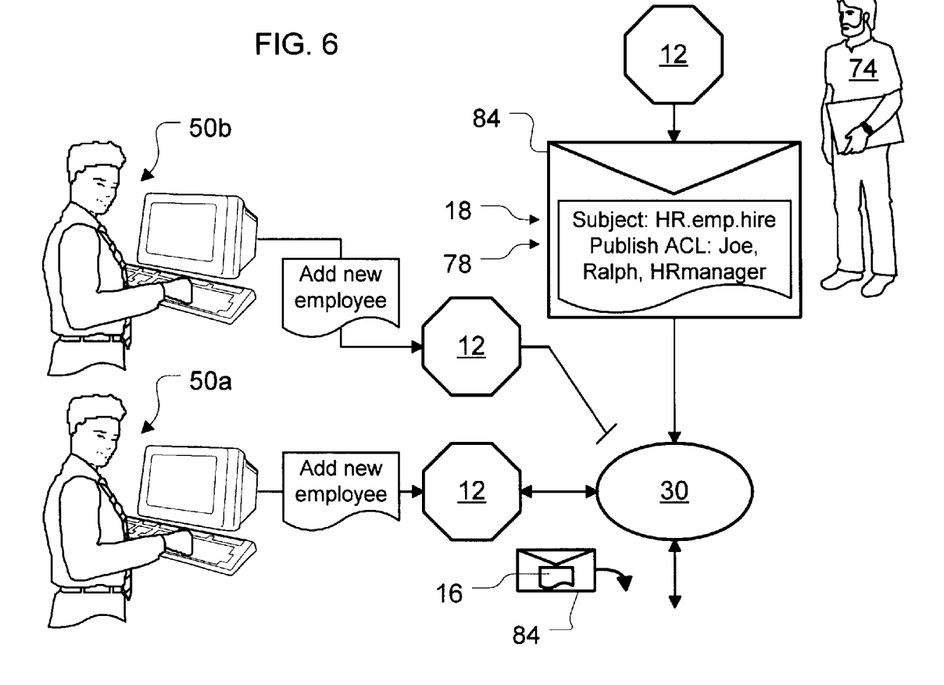
FIG. 6 depicts subject-based access control being provided by the security system.

Services of the extensible class 34 are built upon the core class 32, or "engine," and include an administration service 46 which provides centralized administration and management of the security system 10, and an audit service 48 which provides for recording and retrieving messages 16 on sensitive subjects 18 (FIG. 6). Of course, still other services may be built upon the core class 32 and added in a similar fashion.

Authentication and Identification:

FIG. 3 is a pictorial representation of how the security system 10 abstracts the complexity out of the process of identification and authentication. The users 50 of the security system 10 employ the applications 12 to communicate. The applications 12 may be either publishing applications 24 or subscribing applications 26 (and in most cases will be both, but at different times). Each application 12 includes an instance of the previously noted client 28, which is integrated into the application 12 itself. To interface the clients 28 to applications 12 a simple API is used which provides for passing on to the clients 28 the credentials (user ID 52 and password 54) of the users 50. This places very little (i.e., minimal) burden upon the developers of the applications 12.

In the security system 10, the clients 28 and the brokers 30 mutually authenticate each other. The authentication of brokers 30 to clients 28 is based upon a digital certificate 56 and the associated private key 58 (not shown, but numbered for reference; digital certificates, digital signatures, and public and private keys are generally conventional). Similarly, brokers 30 are used to identify and authenticate clients 28, but using any of various models (FIG. 3 depicts three).

A password based model 60 for authentication of clients 28 may be used wherein each user 50 is assigned a user ID 52 and a password 54. The authentication service 36 then uses the private key 58 of the broker 30 and the password 54 of the user 50 to establish mutual authentication. The password 54 is maintained in the security repository 22 (FIG. 1) of the security system 10, which typically (but not necessarily) is co-resident with the broker 30. The password 54 of the user 50 is usually not sent from the client 28 of an application 12 to the broker 30. However, in some rare situations (e.g., changing an old password 54 to a new one), and also depending upon the requirements of some systems, the password 54 may have to be sent to the broker 30, but it can always be sent encrypted. This password based model 60 can be extended to integrate with domains in Windows NT (T/M of Microsoft Corporation of Redmond, Wash.), or with UNIX, RACF, or any other authentication model which employs a user ID 52 and a password 54.

A digital certificate based model 62 may also be used for authentication of the clients 28. For this, the user 50 has a digital certificate 56 and an associated private key 58 (again, numbered for reference but not shown in the figures). The authentication service 36 uses the private key 58 of the broker 30 and the private key 58 of the user 50 to establish mutual authentication (recall that the preferred embodiment always uses a digital certificate 56 and private key 58 for broker 30 authentication in this manner). Currently this model option is only available to locally running applets or in an environment where an applet has access to a private key 58 of the user 50. The client 28, within the application 12, solicits from the user 50 their permission to use their private key 58, typically in the form of requesting a password 54, which then opens a private key file or a smartcard. Similar to the way in which the security system 10 delivers the authenticated identity of a user 50 of a publishing application 24 to all subscribing applications 26, it may also deliver the digital signature of the user 50 of a publishing application 24 to all subscribing applications 26, and the digital signature can then serve as a means for providing nonrepudiation on a message by message basis.

The password based model 60 works well as a default out-of-the-box type solution, and is currently a preferred embodiment. However, a long term goal is to move entirely to use of the digital certificate based model 62. Unfortunately, until digital certificates 56 become ubiquitous, the password based model 60 can be expected to remain common. Note that a model based upon digital certificates 56 for client 28 authentication is currently usable, but not as a default "out-of-the-box solution" which will work in all current environments.

A third-party trusted host based model 66 may also be used. This model is based upon third-party issued credentials, and is best presently characterized by Kerberos (a protocol developed at the Massachusetts Institute of Technology). The authentication service 36 of the security system 10 may use Kerberos credentials for authenticating both the client 28 and the broker 30. Currently, this option is only available to locally running applets or in an environment where the applet has access to the credential cache of the user 50. This feature requires access to the local disk of the client 28 where the credentials of the user 50 are stored. However, with the imminent support of JDK 1.1 by the browser community, the restriction of accessing disk files by a downloaded applet will hopefully be relaxed. Under this model the client 28 may or may not solicit a user ID 52 and a password 54 from the user 50. This is because a user 50 may have already authenticated itself and obtained proper credentials. If the user 50 has already logged in the security system 10 can access the credential cache—a disk file containing tickets that authenticate the client 28 to the broker 30—and use existing tickets for authentication of the user 50.

Returning now to identification and authentication in general, applications 12 may connect to the security system 10 anonymously, if policy permits. The broker 30 still authenticates itself to the clients 28 in the applications 12, but in these situations the applications 12 may publish messages 16 and subscribe to subjects 18 without having authenticate themselves to the broker 30. This can occur if an access control list (described below) for a subject 18 allows anonymous publications or subscriptions. An anonymous application 12 may authenticate itself at any time during its session with the broker 30 and thus become authenticated. Note that an anonymous session, characterized by an anonymous user 50, will still be able to publish or take delivery of messages 16 with privacy and integrity protections. That is, the security of the flow of messages 16 is independent of the whether the user 50 is authenticated or anonymous.

In the environment created by the security system 10, identification and authentication is the only area where the application 12 itself must address security. As described above, this involvement is in the form of the client 28 at the application 12 soliciting proper information from users 50 for the purpose of authentication. In all cases a password 54 is solicited, even in the case of a public key-based authentication where the private key 58 of a user 50 is typically protected using a password 54. The security system 10 thus abstracts all of the authentication models usable by the authentication service 36 into a simple solicitation of user ID 52 and password 54. Once this information is given to the client 28, the security system 10 then uses whatever authentication service 36 model is in effect between the client 28 and the broker 30. The key advantage of this abstraction is that users 50 and applications 12 (aside from the automatic actions of the clients 28) need not deal with details of the particular authentication model which is used. The same version of an application 12 that runs with a password based model 60 will correctly also run with a digital certificate based model 62.

A question sometimes raised at this point is how might a Java applet get access to local resources (private key file, smartcard, etc.?). Under JDK 1.1, an applet may be digitally signed by the originator. Upon verifying the signature, the browser may allow the applet to access local resources. This is presently the "state of-the-art" in allowing applets access to resources outside of the local resource pool.

Figure 4:
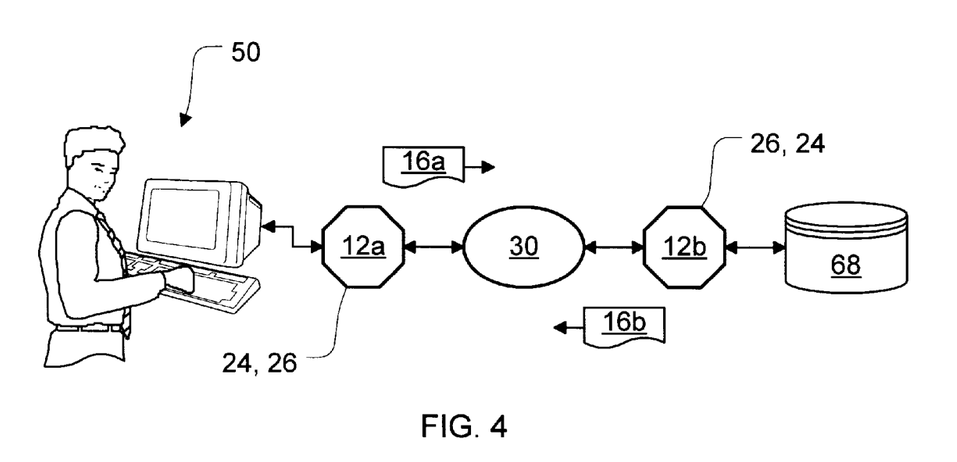
FIG. 4 depicts use of the security system for secure single signon.

The security system 10 may optionally support secure single signon (SSSO). FIG. 4 is an illustration of how a user 50 may employ an application 12a (initially as a publishing application 24) with the security system 10 to communicate with another application 12b (initially acting as a subscribing application 26) and thereby access data in a database 68. First, the user 50 authenticates himself or herself to the security system 10 and using the first application 12a publishes a request (in the form of a message 16a) which will require access to the database 68. The second application 12b then receives this message 16a, and retrieves the authenticated identity of the publishing user 50. The second application 12b, which must be appropriately privileged, logs into the database 68 on behalf of an application 12 as a proxy of the user 50 and retrieves the requested data. The second application 12b, at the database 68 end, now acts as a publishing application 24, by replying to the original request by sending a message 16b containing the desired data back to the first application 12a at the user 50 end, which now receives the desired data as a subscribing application 26.

It should be noted, however, that while the security system 10 provides a foundation for supporting SSSO, it by itself does not and cannot deliver SSSO, rather it can be used as part of an SSSO solution. The foundation that is provided by the security system 10 for SSSO includes two features. The first is authentication of the users 50 of publishing applications 24. When a message 16 is delivered to subscribing applications 26 the authenticated identity of the publishing application 24 (i.e., the publishing user 50) can be retrieved by any subscribing application 26 (which may be subscribing users 50, or processes which have been initiated; it should be appreciated that computerized listening and acting upon network communication can be quite tenuous in relation back to any initiating human user 50). Therefore, within the security system 10, a user 50 needs to establish their credentials only once. The second feature of SSSO here is that a subscribing user 50 may employ a proxy login method to extend SSSO to systems other than the security system 10. A subscribing application 26 may use the authenticated identity of the user 50 of the publishing application 24 in whatever manner it sees fit, including using it to act as or on behalf of the publishing application 24.

Figure 5A:
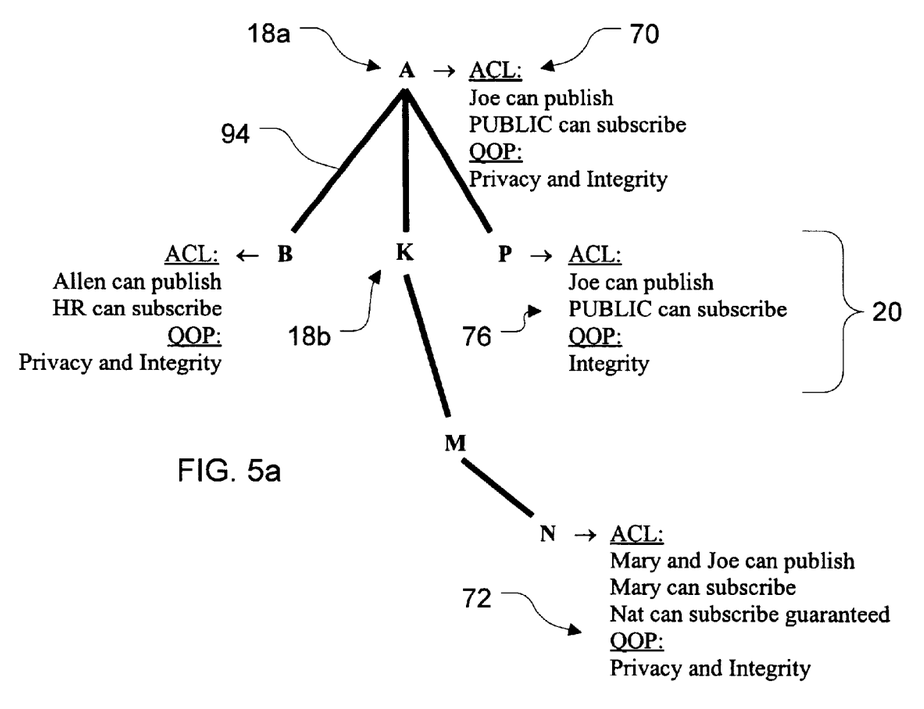
Figure 5B:
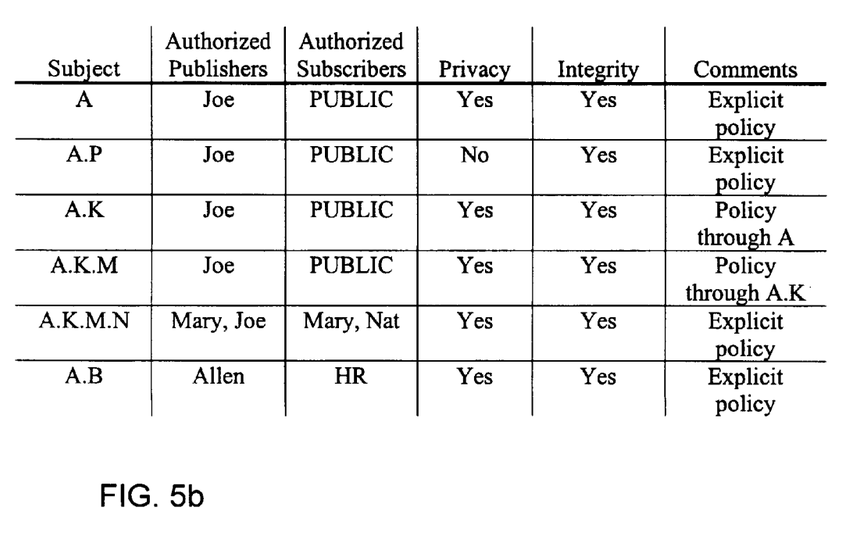
Figure 7:
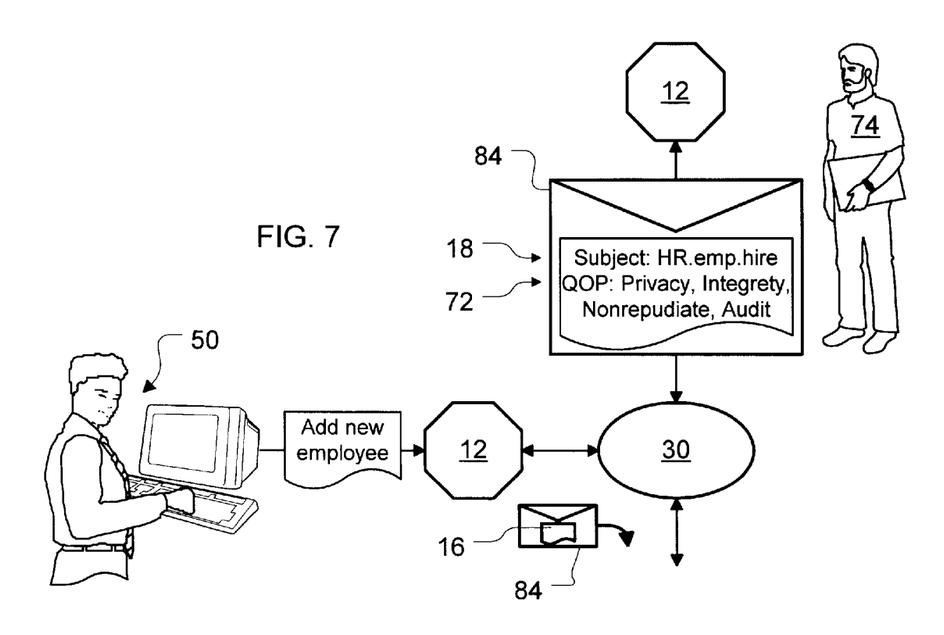
FIG. 7 depicts subject-based qualities of protection being provided by the security system.

Security Policies:

The security system 10 is subject 18 based, and each subject 18 has associated with it a security policy 20 which includes an Access Control List (ACL 70) and a Quality Of Protection (QOP 72). In one example described below, FIGS. 5a–b depict specific subjects 18, security policies 20, ACL's 70, and QOP's 72. In another example described further below, FIGS. 6–7 depict use of the security system 10 by a system administrator 74 and users 50, or by groups 76 (FIG.) to which users 50 belong (reference to users 50 also means groups 76, for general discussion).

Turning now to FIGS. 5a–b, ACL's 70 are used to enforce access control based upon the authenticated identity (i.e., who) of users 50 (e.g., the "PUBLIC" group 76 and individual users 50 named Joe, Mary, Nat, and Allen in FIGS. 5a–b). In the preferred embodiment, the ACL 70 for each subject 18 is actually three lists: a publish ACL 78, which specifies who can publish; a subscribe ACL 80, which specifies who can subscribe; and a guarantee ACL 82 which specifies who can who can ask for guaranteed delivery of messages 16 (guaranteed delivery is a subject 18 based option which provides spooled storage of messages 16 until intended users 50 actually use a subscribing application 26 to obtain them). In the example in FIGS. 5a–b, PUBLIC can subscribe to subject A.K.M but not to subject A.K.M.N., only Mary and Nat can do that.

QOP's 72 (qualities of protection) are used to specify what particular protections are provided to the messages 16 on a subject 18. In the preferred embodiment, the QOP 72 for each subject 18 includes a privacy flag 86, an integrity flag 88, a nonrepudiation flag 90, and an audit flag 92 (noted here but discussed separately below). Combinations of these may be set concurrently.

Continuing with the example of FIGS. 5a–b, the privacy flag 86 and the integrity flag 88 are both set for messages 16 on subject A.K.M.N. Note also that this example does not include any provision for the nonrepudiation flag 90. Since nonrepudiation requires the use of digital signatures, and since not all current authentication models can support such (as discussed above), nonrepudiation is an optional and enhanced feature in the security system 10.

Figure 8:
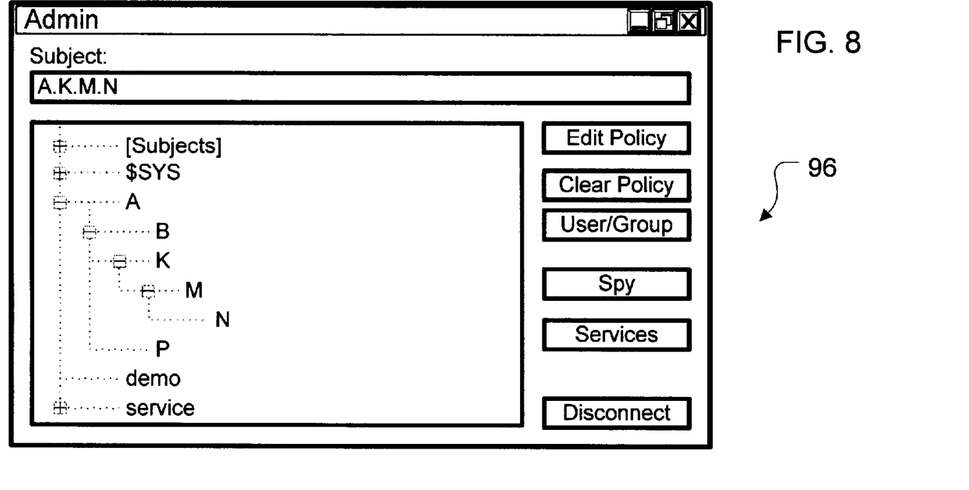
FIGS. 8, 9, and 10 respectively depict implementations of a subject editor, a policy editor, and a user editor used by the security system.
Figure 9:
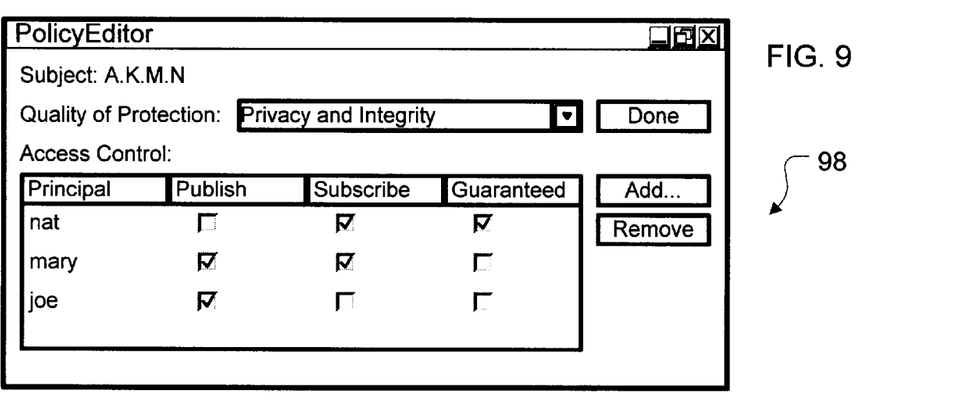
Figure 10:
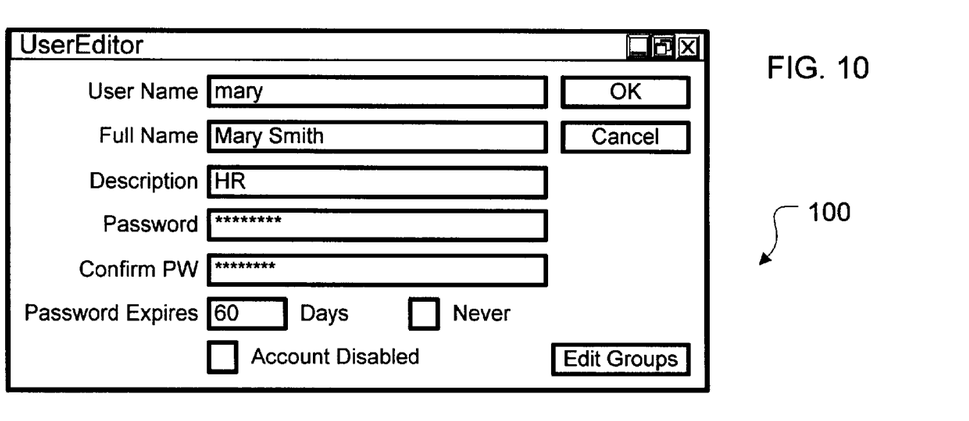

The subjects 18 may be easily organized into hierarchical structures to form subject trees 94, so that the characteristics of a subject 18 are inherited by some or all of its descendent subjects 18. By the use of such subject trees 94 it becomes unnecessary to explicitly associate a security policy 20 with each and every subject 18. A child subject 18b may simply inherit the security policy 20, and hence the ACL 70 and QOP 72, of a parent subject 18a. FIG. 5a depicts an example subject tree 94, while FIG. 5b in table format depicts specific details for the subjects 18 and users 50 of the subject tree 94 (FIGS. 8–10 depict a set of GUI's for controlling these).

In the preferred embodiment a null or default subject 18 may also be defined, and used to further extend the capability of security policies 20. Applying this to the example depicted in FIGS. 5a–b, if the system administrator 74 (not shown, see e.g., FIG. 6 or 7) associates a default security policy 20 with an entire subject tree 94, and if subject A does not have a explicit security policy 20 associated with it, then subject A inherits its security policy 20 from the null or default subject 18. Subsequently, A.K, A.K.M, etc. mail then also inherit their security policies 20 from the null or default subject 18 also.

Another possibility to extend the capability of security policies 20 is wildcard subjects 18 (e.g., A.*, which in FIGS. 5a–b would represent a two level hierarchy including A.B, A.K, and A.P). However, this can cause possible conflicts between the security policy 20 of a wildcard subject 18 and that of a specifically called out subject 18. Therefore, in the preferred embodiment when a client 28 subscribes to a wildcard subject 18, the inventors prefer to provide only access mediation when the client 28 takes delivery of the individual message 16 published on the specific subject 18. For example, A.* as an expression of a subject 18 cannot have an explicit security policy 20 associated with it. Therefore, it must inherit its security policy 20 from A, and therefore any user can also subscribe to A.* since the subscribe ACL 80 for subject A includes the PUBLIC group 76. When a message 16 is published on A.P or A.K the broker 30 delivers it to the users 50 who have subscribed to A.*. However, when a message 16 is published to A.B, that message 16 is only delivered to subscribing users 50 who are in the group 76 for HR. Moreover, if the system administrator 74 changes the subscribe ACL 80 of any subject 18 that matches A.* the broker 30 will correctly enforce the subscribe ACL 80 at the time of message 16 delivery. Effectively, subscribing to a wildcard subject 18 therefore has the semantic of delivering messages 16 on all subjects 18 that match the wildcard for which the subscribing user 50 has authorization to receive.

Turning now to a different example, FIG. 6 presents an illustration of how a system administrator 74 may set a publish ACL 78 for the subject 18 of HR.emp.hire, to impose control over messages 16 that relate to hiring employees in a hypothetical Human Resources department. An envelope 84 is stylistically used to depict the secure "package" provided to messages 16 as they travel between the clients 28 and the broker 30 in the security system 10. [The envelope 84 analogy is appropriate for the QOP 72, but it is not necessarily appropriate for the ACL 70. This is because QOP's 72 do indeed effect the manner in which the message is transmitted, while ACL's 70 are simply used to enforce who can send or receive messages 16]. The particular publish ACL 78 in FIG. 6 indicates that a user 50a named Joe, a user 50 named Ralph (another individual, not shown), as well as HRmanager (a group 76, also not shown) can all publish messages 16 on this subject 18. However, the broker 30 will reject attempts by another user 50b, say Jim (who is not in the HRmanager group 76), to publish on the subject 18 here.

Continuing with the Human Resources department example in FIG. 6, FIG. 7 presents an illustration of how the system administrator 74 may set a specific QOP 72 to specify that all messages 16 published on the subject 18 of HR.emp.hire be both privacy and integrity protected. Furthermore, here all messages 16 are also being required to bear the digital signature of the publisher (say Joe again, user 50a), so that they are nonrepudiable. Note that the system administrator 74 has also asked for the audit service 48 of the security system 10 to audit the nonrepudiatable publish (this is discussed further below).

In the security system 10 the ACL's 70 and QOP's 72 can be changed immediately by adding, deleting, and modifying their contents (and as discussed below, this can also be done centrally yet remotely). Further, since subjects 18 can be organized into subject trees 94, the system administrator 74 (or a suitably authorized user 50) can create default ACL's 70 and QOP's 72 for parent subjects 18a, which can be inherited by child subjects 18b (FIG. 5a), even if they are added in the future.

In a typical scenario a system administrator 74 will set the ACL 70 and QOP 72 for a subject 18 once, and then change them rather infrequently. However, enforcement takes place every time an operation is performed on the subject 18. This works because the clients 28 in cooperation with the broker 30 of the security system 10 automatically handle security enforcement at runtime, not the underlying applications 12. Notably, no API is needed for implementing authorization and access control or qualities of protection.

The use of ACL's 70 and QOP's 72 may have particular ramifications in the context of existing applications 12. For example, if the system administrator 74 removes user 50a Joe from the publish ACL 78 for a subject 18, then the security system 10 will reject all messages 16 published by him on that subject 18. This requires no change to Joe's publishing application 24, and in fact it need not even restart. For another example, if the system administrator 74 removes the nonrepudiation requirements for messages 16 on the subject 18 of HR.emp.hire there are no changes made to the existing applications 12. And, in fact, they may continue to run, with the new QOP 72 in effect the next time any of them publishes a message 16 on HR.emp.hire. This very dynamic security control ability is a key area of strength for the security system 10.

As depicted in FIGS. 6–7, and as previously noted, one can view QOP's 72 as providing envelopes 84 which are associated with each message 16. The envelope 84 describes the ACL 70 and QOP 72 for subjects 18, and thus for messages 16, so that the security system 10 can automatically enforces elements of the QOP 72 to protect the contents of the envelope 84.

The QOP's 72 may support protection using different algorithms, with the system administrator 74 setting the defaults. Some examples include DES (Data Encryption Standard, currently the most widely used encryption algorithm) for privacy protection, MD5 (Message Digest 5, a popular cryptographic checksum algorithm) and SHA (Secure Hash Algorithm, another popular cryptographic checksum algorithm) for integrity protection, and DSA (Digital Signature Algorithm, a popular algorithm using public/private key pairs for obtaining and verifying digital signatures) for nonrepudiation.

As noted above, nonrepudiation is somewhat special. It can be provided if the client 28 has a private key 58. A nonrepudiated publish means that a message 16 is digitally signed by the publishing user 50. Furthermore, if desired, the signature of the publishing user 50 is available to and can be retrieved by all subscribing users 50 upon message 16 delivery. A nonrepudiated delivery means that the digital signature of the subscriber on the about-to-be-delivered message 16 is solicited by the client 28 and the message 16 is only delivered after the signature is safely transmitted to the broker 30.

There are many ways to employ the nonrepudiation capabilities of the security system 10 for building commercial-grade applications. As an example, consider a provider organization that sells an online magazine. Using the nonrepudiated subscribe option, the provider is assured that its customers cannot deny having ordered the magazine. The nonrepudiated delivery feature assures the provider that its customer cannot deny that they received the magazine. And, the nonrepudiated publish feature assures the customer that the source of the magazine is really the online provider organization. In this manner, an organization can build a service where all aspects of a transaction are nonrepudiatable, and therefore a customer can be billed for engaging in that transaction. Moreover, with the rapidly emerging recognition of digital signatures as legally binding, the security system 10 can support true electronic commerce. Several states have already passed legislation recognizing digital signatures as legally binding, and many others have similar legislation pending. Nonrepudiation has a close relationship with the audit service 48 (discussed below).

The security system 10 also allows signing and forwarding, to support a secure workflow framework. The subscriber to a subject 18 may receive and verify the digital signature of a publisher. Then the recipient can attach its own digital signature to the message 16, and forward the original message 16 with both signatures attached.

Administration and Management:

The administration service 46, as previously noted, is part of the extensible class 34 built upon the secure publish/subscribe core class 32 of the security system 10. Included in the administration service 46 are provisions for defining subjects 18 and forming them into subject trees 94 (FIG. 8 illustrates a subject editor 96 in use for this); for adding and modifying security policies 20 for the subjects 18, as respective QOP's 72 and ACL's 70 for each subject 18 (FIG. 9 illustrates a policy editor 98 in use for this); and for adding and modifying users 50 and groups 76 (FIG. 10 illustrates a user editor 100 in use for this).

The system administrator 74 manages the administration service 46 of the security system 10 as a suitably authorized user 50 who publishes messages 16 on administration subjects 18. This makes the security system 10 centrally yet also remotely manageable, and also quite easy to learn and use.

For example, to add a new user 50 to the security system 10, the system administrator 74 would publish a message 16 on the appropriate subject 18 describing the user 50 in detail (see e.g., FIG. 10; but recall that only the user ID 52 and a password 54 are strictly necessary). Since this would be treated as a normal publish operation by the security system 10, this message 16 would be subject to all available security features. That is, the system administrator 74 would have to provide their own user ID 52 and a password 54 when using the user editor 100 of FIG. 10 as a publishing application 24, before the broker 30 of the security system 10 would accept the message 16 and route it to the targeted subscribing application 26 (here a security repository 22 such as that in FIG. 1). If desired for administration subjects 18, the audit service 48 could also audit the message 16. And, by use of appropriate QOP's 72 in the security policies 20 of administration subjects 18, the security system 10 can also control privacy, integrity, and nonrepudiation for the message 16. Thus, by defining a set of security related administration subjects 18, and in the security policies 20 for these defining ACL's 70 which include the system administrator 74, effective control of the security system 10 is accomplished.

This technique for implementing administration also facilitates autonomous and delegated administration. For example, expanding upon a previous point, an ACL 70 for managing other ACL's 70 may specify multiple individual users 50 or a group 76. In this manner the system administrator 74 may allow a group 76, say the human resources department, to manage its own ACL's 70. Assuming that all messages 16 in this department use the subject tree 94 for human resources, this is easily accomplished with a message 16 from the system administrator 74 on the appropriate administration subject 18.

In the preferred embodiment, the security system 10 uses a graphical user interface (GUI) built upon the administration service 46 (although other implementations are quite possible). GUI examples such as the subject editor 96 of FIG. 9, the policy editor 98 of FIG. 8, and the user editor 100 of FIG. 10 have already been mentioned. Their use as part of the overall GUI of the security system 10 permits easy publishing and subscribing to administrative subjects 18 as a programmatic interface to the administration service 46, which can then easily be used by an organization wanting to integrate the administration service 46 with an existing system management infrastructure.

Alternately, organizations can build their own administrative interface or write application scripts for bulk management (say adding 1000 ACL's 70, or adding a new user 50 to ten different groups 76, etc.) by using this programming interface capability of the security system 10 for security administration. In the preferred embodiment, the programming interface consists of a series of predefined subjects (e.g. "$ISYS.admin.security.addUser"), and pre-defined Java classes that represent users 50, groups of users 50, QOP's 72, and ACL's 70.

Figure 11:
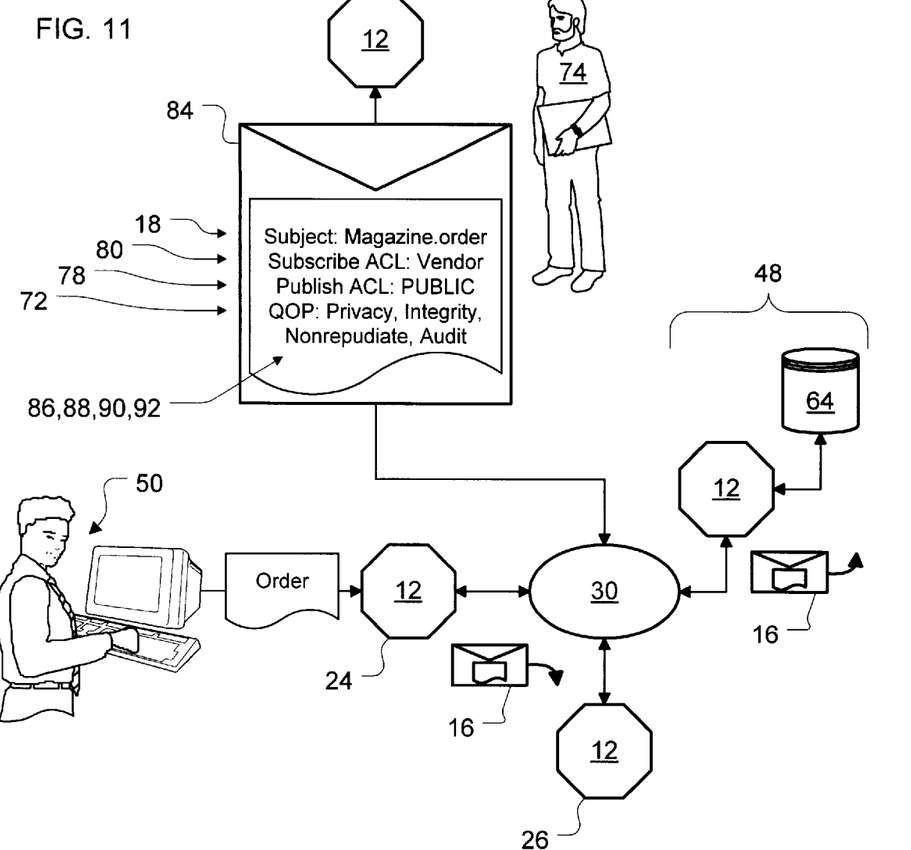
FIG. 11 depicts the security system employed in a commercial context using auditing and nonrepudiation.

Audits:

The purpose of the audit service 48 is to passively listen for messages 16 on subjects 18 that need to be audited, and to then record them in persistent storage 64 (FIG. 11). As previously noted, in the preferred embodiment of the security system 10 an audit flag 92 may be set by the system administrator 74 in the QOP 72 for a subject 18. This indicates to the security system 10 that all messages 16 on the subject 18 are to be audited, and that the broker 30 should send a copy of all such messages 16 to the audit service 48. This technique ha, a number of advantages. It makes implementation itself easy, and it imposes no particular burdens (e.g., learning) upon the system administrator 74 or users 50. Further, by treating audit as subject 18 based, subject trees 94 can be used which permit all of the previously discussed advantages of inheritance by child subjects 18, and delegation of degrees of control by the system administrator 74. In fact, the only major conceptual differences are that messages 16 on an audited subject 18 have an added "pseudo recipient" and that they get stored in the persistent storage 64.

FIG. 11 presents an illustration of a typical commercial online transaction employing nonrepudiation and audit. A subject 18 (say "Magazine.order") is created by the system administrator 74 which has a security policy 20 with a subscribe ACL 80 specifying that the vendor (i.e., the user 50 of the security system 10 who is providing the online magazine) can subscribe to messages 16 on this subject 18 (i.e., can "see" orders with a subscribing application 26, and thereby take and fill them). The system administrator 74 also creates a publish ACL 78 which may specify "PUBLIC" so that all possible users 50 may publish messages 16 ordering the magazine, or it may be used to restrict order placement to a narrower set of users 50 (e.g., by only letting only the group 76 of "OrgMembers" order; say for a trade group which will not let non-members order its trade journal).

In FIG. 11 the system administrator 74 has set the QOP 72 for the subject 18 to include the privacy flag 86 and the integrity flag 88 (which provide extra security), the non-repudiation flag 90 (so that users 50 cannot repudiate placing orders), and the audit flag 92. If a user 50, say Joe again, authenticates himself to the security system 10 and then executes a publishing application 24 to send an order message 16 on the particular subject 18 ("Magazine.order"), the broker 30 of the security system 10 routes a copy of the message 16 to the audit service 48, with the content of the message 16 here being the order request and the digital signature of Joe the user 50. The presence of the message 16 in the audit service 48 then provides proof that a message was sent and when, and the digital signature of Joe makes the message 16 non-repudiatable.

In this manner, the audit service 48 builds upon the secure publish/subscribe engine (i.e., core class 32) of the security system 10. When the audit service 48 subscribes to a subject 18, all messages 16 published on that subject 18 can be tracked and audited.

Figure 12:
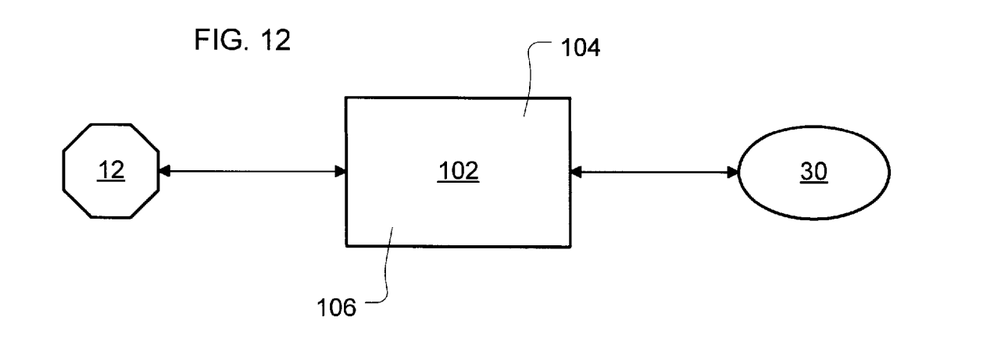
FIG. 12 depicts how the security system may easily be integrated with a firewall.

Firewalls:

FIG. 12 depicts how the security system 10 may easily be integrated with a firewall 102. In the preferred embodiment this is accomplished by the security system 10 using a proxy broker 104 (a special variation on a generic proxy 106) which listens on a well known (i.e., predetermined) TCP port, and passes messages 16 on to the broker 30 of the security system 10. For example, port number 560 has been assigned by the Internet Assigned Number Authority (IANA) to parties involved in this application. [IANA is the same body that assigned 21 to FTP, 80 to TTP, 23 to telnet, etc.]

This method is not much different than those already widely used. In the prior art a firewall 102 might also use a generic proxy 106 for passing messages 16 inside a firewall 102. Many leading firewall vendors use such generic proxies 106. For example, Raptor Systems, Inc. (of Waltham, Mass.) calls this a General Service Passer (GSP), and in fact uses it to pass Network News Transfer Protocol (NNTP, usenet) messages. Trusted Information System's (TIS) firewall calls this the "Plug gateway", and like Raptor uses it to provide NNTP pass through. This technique is sometimes called a "hole-in-the-firewall," and those who view firewalls 102 as being very important are not fond of this type of solution.

The "state-of-the-art" solution is to have an application proxy (or a gateway), which in the case of the security system 10 is the proxy broker 104, which resides on the firewall 102, and which mediates and validates access between the inside and the outside. However, note that by placing a proxy broker 104 of the security system 10 on the firewall 102 concern is raised about the number of messages 16 processed through the proxy broker 104 and the overall performance impact this has on the firewall 102. This is precisely the reason that people do not run NNTP on the firewall 102 (too much traffic).

In addition to the above mentioned examples, various other modifications and alterations of the inventive security system 10 may be made without departing from the invention. Accordingly, the above disclosure is not to be considered as limiting and the appended claims are to be interpreted as encompassing the true spirit and the entire scope of the invention.

INDUSTRIAL APPLICABILITY

The present security system 10 is well suited for providing security in network environments. The security needs of an organization communicating in such network environments can be complex. Yet, these must also allow flexibility for changes in the face of dynamic business requirements. For example, a competitor in one area of business may very well be a partner in another area. While flexible security goals can be established, the implementation of these is often rigid and difficult to change, due to the fact that part of the implementation is necessarily left to the application 12. Therefore, The developers of applications 12 must understand and enforce security. Employing the security system 10, developers can easily build comprehensive security capability into such applications 12, and such applications 12 need have only minimal impact upon their users 50. It follows that since there is little application 12 development required, security in an organization can be enforced effectively and in its entirety. Further, due to inherent characteristics of the subject 18 based design of the security system 10, any changes made to security can take effect immediately.

For the above, and other, reasons, it is expected that the security system 10 of the present invention will have widespread industrial applicability. Therefore, it is expected that the commercial utility of the present invention will be extensive and long lasting.

The claimed invention is:

1. A system for providing security for messages between users on a computer network, the system comprising:
   means for associating a security policy to any of a plurality of previously defined subjects, wherein said subjects are not the users;
   means for assigning said messages to said subjects; and
   a broker to identify and authorize said users and to enforce said security policies as said messages are communicated between said users in said network.

2. The system of claim 1, wherein:
   respective said security policies specify which said users may publish and which said users may receive said messages on associated respective said subjects.

3. The system of claim 1, wherein:
   specification in said security policy of at least one member of an attribute set consisting of a privacy attribute, an integrity attribute, a nonrepudiation attribute, and an audit attribute;
   said messages on said subjects having said privacy attribute set in their security policy are encrypted;
   said messages on said subjects having said integrity attribute set in their security policy are checksum protected;
   said messages on said subjects having said nonrepudiation attribute set in their security policy are digitally signed; and
   said messages on said subjects having said audit attribute set in their security policy are copied into an archive.

4. The system of claim 1, wherein:
   said users employ an application program to publish and receive said messages;
   said application program includes a client which solicits credentials from said user; and
   said client obtains access to publish and receive said messages on said network from said broker based upon said credentials.

5. The system of claim 4, wherein:
   said credentials include a user ID and a password.

6. The system of claim 4, wherein:
   said broker is authenticated to said client using digital certificate authentication; and
   said client is authenticated to said broker using a member of the authentication model set consisting of password authentication, digital certificate authentication, and third-party trusted host authentication.

7. The system of claim 1, further comprising:
   a security repository for securely storing said subjects, said security policies, and associations between them.

8. The system of claim 7, wherein:
   said plurality of previously defined subjects includes an administration subject; and
   said broker updates said security repository by receiving instances of said messages published on said administration subject, thereby administering the system.

9. The system of claim 8, wherein:
   said subjects are added to and deleted from said security repository by publication of specific said messages on said administration subject; and
   said security policies are added, modified, and deleted by publication of specific said messages on said administration subject.

10. The system of claim 8, wherein:
    said security policies include access control lists to specify which said users may publish and receive said messages on particular said subjects; and
    said users are added to and deleted from said access control lists by publication of messages on said administration subject.

11. The system of claim 8, wherein:
    said security policies include a plurality of settable security attributes for defining types of security to apply; and
    said security attributes are set and unset by publication of specific messages on said administration subject.

12. The system of claim 7, wherein:
    said subjects are ordered in a hierarchy; and
    said security policies assigned to higher ordered said subjects in said hierarchy apply also to lower ordered said subjects in said hierarchy, thereby permitting inheritance of said security policies.

13. The system of claim 12, wherein:

said security policies assigned to higher ordered said subjects in said hierarchy are overridden by any said security policies assigned to lower ordered said subjects in said hierarchy, thereby permitting more flexible administration of inheritance by said security policies.

14. A method of providing security for messages between users of a computer network, the steps comprising:

defining subjects for said messages, wherein said subjects are not the users;

associating a security policy with each said subject;

identifying and authenticating said users to a broker; and enforcing said security policy with said broker automatically as said messages are communicated between said users in said network.

15. The method of claim 14, further comprising:

specifying in each said security policy which of said users may publish said messages on the associated said subject and which of said users may receive said messages on the associated said subject.

16. The method of claim 14, further comprising:

specifying in each said security policy at least one member of an attribute set consisting of a privacy attribute, an integrity attribute, a nonrepudiation attribute, and an audit attribute;

encrypting instances of said messages on said subjects in which said security policy specifies said privacy attribute;

checksumming instances of said messages on said subjects in which said security policy specifies said integrity attribute;

origin vouching instances of said messages on said subjects in which said security policy specifies said nonrepudiation attribute; and auditing instances of said messages on said subjects in which said security policy specifies said audit attribute.

17. The method of claim 16, wherein:

said step of encrypting uses Data Encryption Standard;

said step of checksumming uses Message Digest 5; and said step of origin vouching uses Digital Signature Algorithm.

18. The method of claim 15, wherein:

said users employ an application program to publish and receive said messages; and said application program includes a client which performs said step of identifying and authenticating said users to said broker; and the method further comprising:

soliciting credentials from said user with said client; and controlling access of particular said users to publish and receive said messages on said network based upon said credentials.

19. The method of claim 18, further comprising:

authenticating said client to said broker; and authenticating said broker to said client, thereby controlling access by said users to said network.

20. The method of claim 15, further comprising:

storing said subjects, said security policies, and associations between them in a security repository.

21. The method of claim 20, further comprising:

publishing administration messages on a previously defined administration subject;

receiving said administration messages with said broker; and updating said security repository based upon said administration messages, thereby administering security of said network.

22. The method of claim 21, further comprising:

controlling access of particular said users to publish and receive said messages on said network based upon adding to and deleting from said security repository by publication of specific said administration messages.

23. The method of claim 22, further comprising:

defining at least one said user as an administration user; and publishing at least one specific said administration message requesting that only said administration users have access to publish on said administration subject, thereby controlling security over said administration subject.

24. The method of claim 23, further comprising:

controlling types of security applied for specific said subjects by publication of specific said administration messages.

25. The method of claim 15, further comprising:

ordering said subjects into a hierarchy; and applying said security policies assigned to higher ordered said subjects in said hierarchy also to lower ordered said subjects in said hierarchy, thereby permitting inheritance of said security policies.

26. The method of claim 25, further comprising:

overriding selectively any said security policies assigned to higher ordered said subjects in said hierarchy by specifically assigning different said security policies to lower ordered said subjects in said hierarchy, thereby permitting more flexible administration of inheritance by said security policies.

* * * * *